United States Patent [19]

Gray et al.

[11] Patent Number: 5,022,161
[45] Date of Patent: Jun. 11, 1991

[54] PLATE FIN COLLAR GAUGING APPARATUS

[75] Inventors: Kenneth P. Gray, E. Syracuse; Michael L. McDonough, Jamesville, both of N.Y.

[73] Assignee: Carrier Corporation, Syracuse, N.Y.

[21] Appl. No.: 572,572

[22] Filed: Aug. 27, 1990

[51] Int. Cl.⁵ .............................................. G01B 5/02
[52] U.S. Cl. ...................................... 33/548; 33/833; 33/803; 33/804; 33/805; 33/549
[58] Field of Search ................. 33/548, 549, 555, 833, 33/836, 803, 804, 805, 522

[56] References Cited

U.S. PATENT DOCUMENTS 3,769,713 11/1973 Norman .............................. 33/548 X
4,112,579 9/1978 Kaye ................................... 33/522 X Primary Examiner—Harry N. Haroian

[57] ABSTRACT

An apparatus for gauging the height and outer diameter of a collar in a heat exchanger plate fin. The apparatus comprises a vertically displaceable carriage overhanging a base on which a plate fin can be mounted for measurement. On the carriage are mounted two displacement indicators, in the preferred embodiment electrical linear gauges. One indicator is oriented so that its indicator probe measures vertical displacement and, through the configuration of the apparatus, produces an output that can be translated to a measure of the height of the fin collar. The other indicator is oriented so that its indicator probe measures horizontal displacement. The independent but concerted positioning of two measuring blades to contact diametrically opposite points on the fin collar is resolved into an output from the horizontal indicator that can be translated into a measure of the outer diameter of the fin collar. In a preferred embodiment, the outputs of the two indicators are read on electrical digital readouts. No other operator action is required to obtain a measurement than to raise the handle, position the plate fin for measurement, lower the handle and read the indicator outputs. An application for the present invention is to monitor the output of a fin press used in manufacturing plate fins for quality assurance and fin die adjustment purposes.

2 Claims, 5 Drawing Sheets

PLATE FIN COLLAR GAUGING APPARATUS

BACKGROUND OF THE INVENTION

The present invention relates generally to the manufacture of plate fin and tube heat exchangers. More particularly, the present invention relates to an apparatus used for gauging certain dimensions on the collars of plate fins to insure the proper operation of a fin press used to manufacture plate fins.

Plate fin and tube heat exchangers are widely used in a variety of applications, such as in air conditioning and refrigeration systems and in engine cooling systems. In a typical plate fin and tube heat exchanger, a fluid such as a coolant or refrigerant flows through a closed tubing arrangement while a gas such as air flows over the tubes so that heat may be transferred between the gas and the fluid. A plurality of plate fins are attached to the exterior of the tubes in the heat exchanger to increase the effective surface area of the tubes and thus enhance heat transfer Plate fins are typically fabricated by progressively stamping a coil of plate stock and then cutting the stamped stock to a desired length to form an individual fin. The appropriate number of fins for the type of heat exchanger being manufactured are then stacked together Previously prepared U-shaped or hairpin tubes are inserted or laced through holes in tubesheets and the stacked fins and then expanded to make firm contact with the fins and tubesheets for good thermal conductivity between tube and fin as well as for structural integrity. Short U-shaped tubes, or return bends, are then attached to the ends of the hairpin tubes and secured by a suitable process such as welding, brazing or soldering to form a closed fluid flow path within the heat exchanger.

The stamping process for forming the plate fins generally comprises the use of a die to form the desired surface of the fin and to form the openings through which the hairpin tubes are laced. The openings formed have collars that project above one side of the fin and serve to separate the stacked fins one from another, thus allowing for the passage of gas through the completed heat exchanger. Because the height of the collar determines the fin spacing within the heat exchanger, that dimension is critical in assuring that the heat exchanger will function as designed. The collar diameter is also a critical dimension, for the diameter determines the quality of the joint between fin and tube when the tube is expanded. It is important for assuring the quality of the finished heat exchanger therefore that the output of the fin press be monitored and required adjustments made in order to insure that the press is producing fins having the proper collar height and diameter. In a typical manufacturing operation, it is necessary to check the collar height and diameter about once per shift.

Production or quality assurance personnel may make the height and diameter measurements using hand held scales, calipers, micrometers or the like. Such methods, however, are slow, tedious and may yield varying results depending on the skill and technique of the individual taking the measurements. There is a need, therefore, for a means of gauging the critical collar dimensions of a plate fin that is rapid, simple to operate and capable of producing accurate and repeatable results.

SUMMARY OF THE INVENTION

An object of the present invention is to provide a means of measuring the height and diameter of collars in heat exchanger plate fins.

Another object of the present invention is to enable the monitoring of the output of a fin press used in the manufacture of heat exchanger plate fins for quality assurance, press adjustment or other purposes.

A further object of the present invention is to enable the measurement of plate fin collars accurately, rapidly and with high repeatability by persons possessing any level of skill.

A still further object of the present invention is to produce an measuring apparatus that is simple in design and operation, rugged and reliable These nd other objects of the invention are achieved in a lever operated apparatus for simultaneously gauging the desired dimensions of a heat exchanger plate fin collar. The apparatus comprises a vertically displaceable carriage overhanging a base on which a plate fin can be mounted for measurement. On the carriage are mounted two displacement indicators, in the preferred embodiment electrical linear gauges. One indicator is oriented so that its indicator probe measures vertical displacement and, through the configuration of the apparatus, produces an output that can be translated to a measure of the height of the fin collar. The other indicator is oriented so that its indicator probe measures horizontal displacement. The independent but concerted positioning of two measuring blades to contact diametrically opposite points on the fin collar is resolved into an indicator output that can be translated into a measure of the diameter of the fin collar. The movement of the measuring blades resemble that which a human operator would make in measuring the collar diameter with a hand held caliper or micrometer. In operation, a manual operating handle is raised to lift the carriage and measuring devices to provide clearance for positioning a plate fin on the base of the apparatus for measurement. After the fin is in place for measurement, the operating handle is lowered, lowering the carriage and placing the measuring devices in position to measure the desired parameters. In a preferred embodiment, the outputs of the two indicators are read on electrical digital readouts. No other operator action is required to obtain a measurement than to raise the handle, position the plate fin for measurement, lower the handle and read the indicator outputs.

BRIEF DESCRIPTION OF THE DRAWINGS

The accompanying drawings form a part of the specification. Throughout the drawings, like reference numbers identify like elements

DESCRIPTION OF THE PREFERRED EMBODIMENTS

Figure 1:
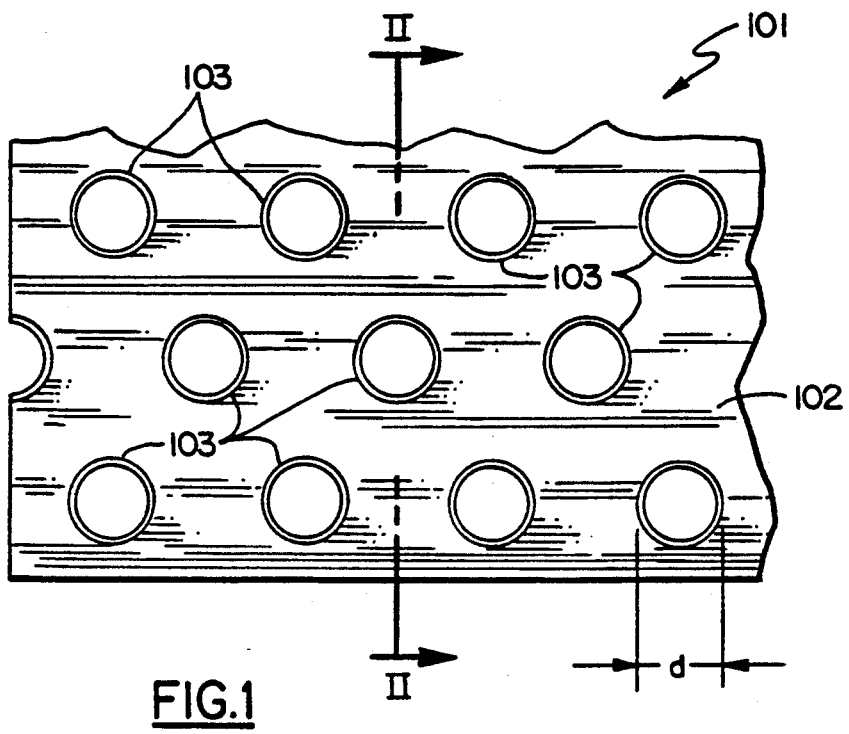
FIG. 1 is a plan view of a section of a typical heat exchanger plate fin.
Figure 2:
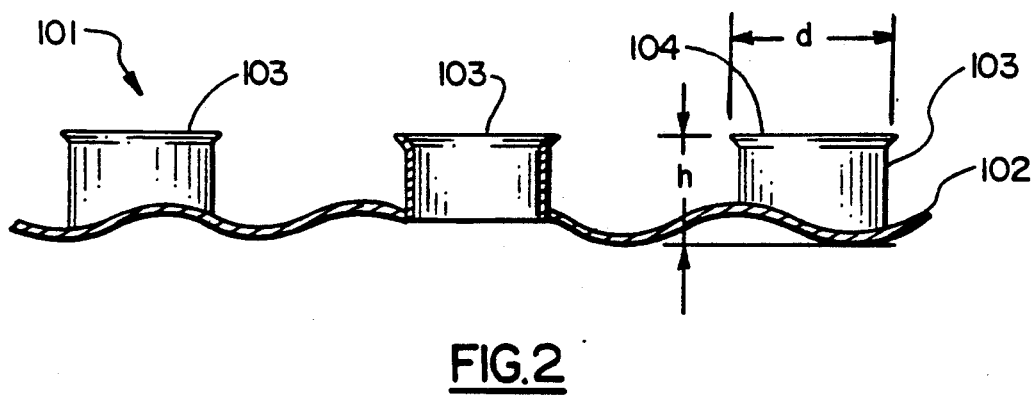
FIG. 2 is a sectional elevation view of the plate fin depicted in FIG. 1 taken through line II—II.

FIGS. 1 and 2 illustrate a heat exchanger plate fin of the type that may be gauged by the apparatus of the present invention. FIG. 1 is a plan view of a section of such a plate fin. Plate fin 101 comprises generally planar base portion 102 into which have been extruded a plurality of fin collars 103. FIG. 2 is a sectional elevation view of the plate fin illustrated in FIG., showing fin collars 103 extending outward from base portion 102 to collar outer end 104 Each of fin collars 103 has a diameter d and extends to a height h from base portion 102. It is the dimensions d and h that the apparatus of the present invention has been developed to measure.

Figure 3:
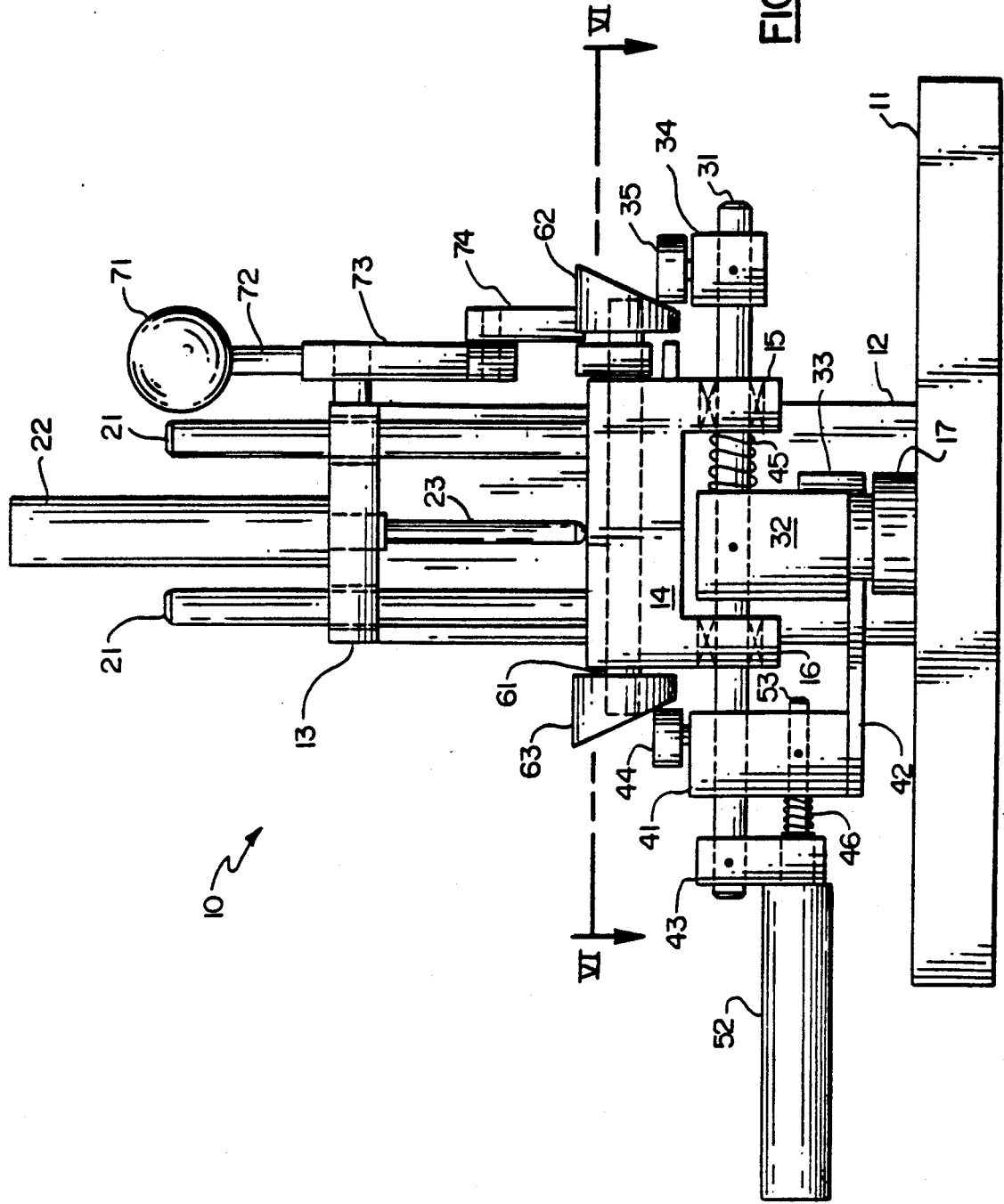
FIG. 3 is a front elevation view of the apparatus of the present invention.
Figure 4:
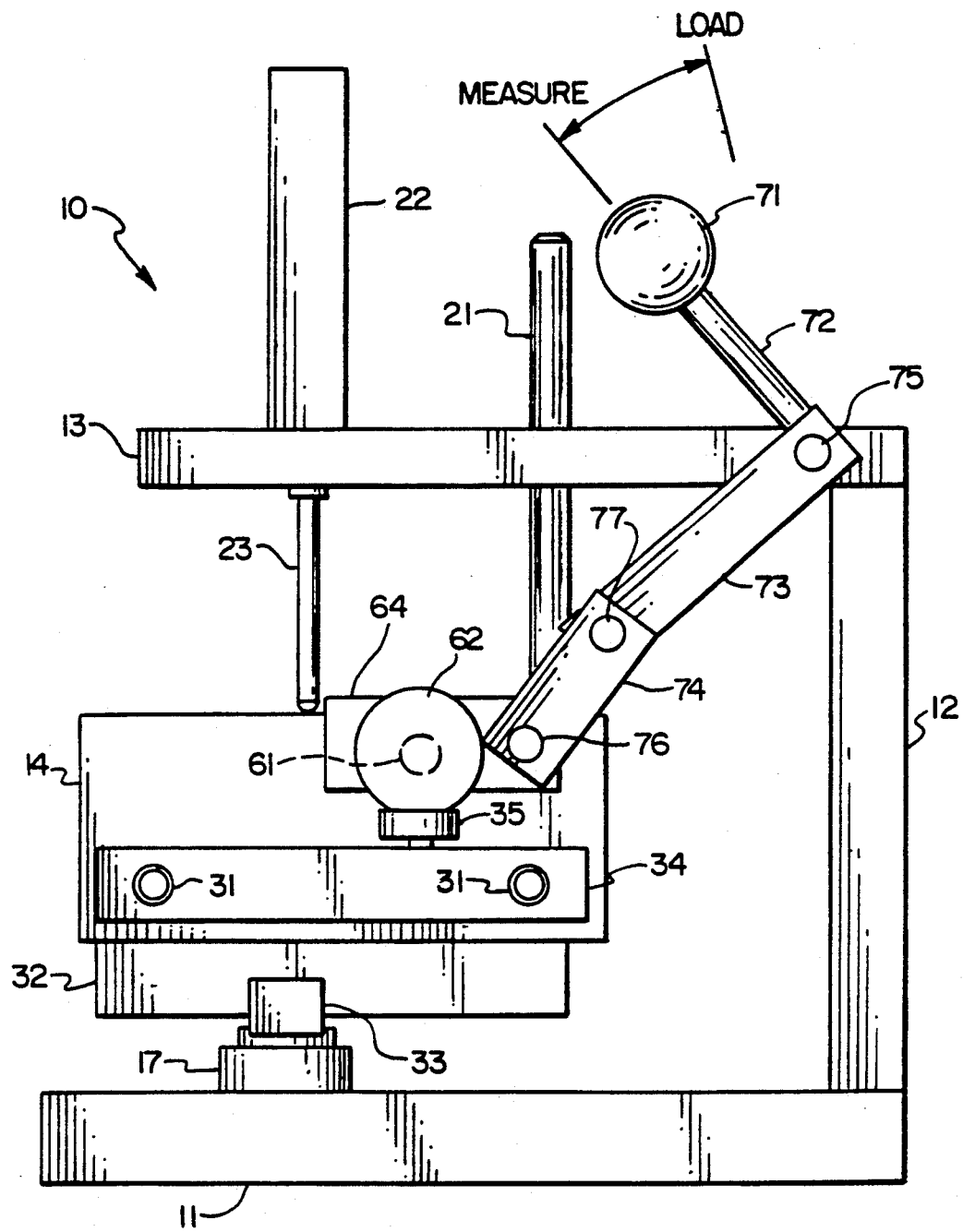
FIG. 4 is a right side elevation view of the apparatus of the present invention.

FIGS. 3 and 4 are, respectively, front and right side elevation views of a plate fin collar gauging apparatus constructed according to the teaching of the present invention. In FIGS. 3 and 4 are shown gauging apparatus 10 comprising base 11, post 12, hanger 13, shafts 21 and carriage 14. Mount pin 17 is centrally located on base 11 and is of an appropriate height and diameter to serve to position and hold stationary a fin collar 103 (FIG. 2) of a plate fin 101 (FIG. 1) for measurement. Post 12 is fixed to base 11 and hanger 13 is fixed to post 12 so that hanger 13 overhangs mount pin 17. Shafts 21 are slideably mounted in hanger 13 so that carriage 14, which is fixed to shafts 21, may be displaced vertically upward and downward with respect to base 11. Vertical indicator 22 is fixed to hanger 13 and has a vertical probe 23 extending downward to contact the top of carriage 14 so that vertical displacement of carriage 14 with respect to hanger 13 results in a similar displacement of vertical probe 23. Vertical indicator 22 may be of any suitable type, such as Mitutoyo linear gauge Part No. 542-365. The Mitutoyo gauge has a remote digital indicator (not shown) for reading the displacement of probe 23.

Turning to FIG. 3 only, carriage 14 has legs or shoulders 15 and 16, extending vertically downward from its sides to form a space between the two legs and under the main body of carriage 14. Horizontal shafts 31 are slideably mounted through legs 15 and 16. Measuring block 32 is fixedly mounted to shafts 31 between legs 15 and 16 so that the bottom of block 32 will contact outer end 104 of fin collar 103 when plate fin 101 (FIGS. 1 and 2) is placed on mount pin 17 for measurement and carriage 14 is displaced downward toward base 11. The vertical distance between the bottom of measuring block and the top of carriage 14 is fixed so that readings of the output of vertical indicator 22 taken with a plate fin mounted on base 11 can readily be translated into the dimension h of fin collar 103 (FIG. 2).

Cam follower 35 is mounted on roller block 34, which is fixedly mounted on shafts 31 outside leg 15. Cam follower 44 is mounted on blade block 41, which is slideably mounted on shafts 31 outside leg 16

Measuring blade 33 is mounted on the same side of measuring block 32 as leg 15 and extends below the bottom of block 32. Measuring blade 42 is fixedly mounted to blade block 41 and extends horizontally toward measuring blade 33. Measuring blades 33 and 42 are used in measuring dimension d of collar outer and 104 (FIG. 2) as will be subsequently described.

Horizontal indicator 52 is fixedly mounted to shafts 31 by means of indicator block 43. Horizontal indicator probe 53 of indicator 52 slideably extends through indicator block 43 and fixedly contacts blade block 41, so that displacement of blade block 41 with respect to indicator block 43 will result in a similar displacement of horizontal indicator probe 53. Like vertical indicator 22, horizontal indicator 52 may be of any suitable type, such as Mitutoyo linear gauge Part No. 542-365.

Cam shaft 61 is horizontally mounted in carriage 14 so that it has a limited arc of rotation Cam 62 is mounted on one end of cam shaft 61 so that it engages cam follower 35. Cam 63 is similarly mounted on the other end of cam shaft 61 so that it engages cam follower 44.

Spring 45 is mounted so that it urges measuring block 32 and measuring blade 33 horizontally toward blade block 41 and measuring blade 42. Spring 46 is mounted so that it urges blade block 41 horizontally away from indicator block 43 toward measuring block 32 and measuring blade 33

Shown best in FIG. 4 is the arrangement and interconnection of handle 71, cam shaft 61 and carriage 14. Attached to cam shaft 61 is cam link 64. Attached to cam link 64 by pin 76 is lift link 74. Lift lever 73 is attached to lift link 74 by pin 77 and to hanger 13 by shoulder screw 75. Lift lever 73 is operated by handle 71 through handle shaft 72. The connections between lift lever 73 and hanger 13, between lift lever 73 and lift link 64 and between lift link 64 and cam link 64 are all such that those members may freely rotate with respect to each other.

Figure 5:
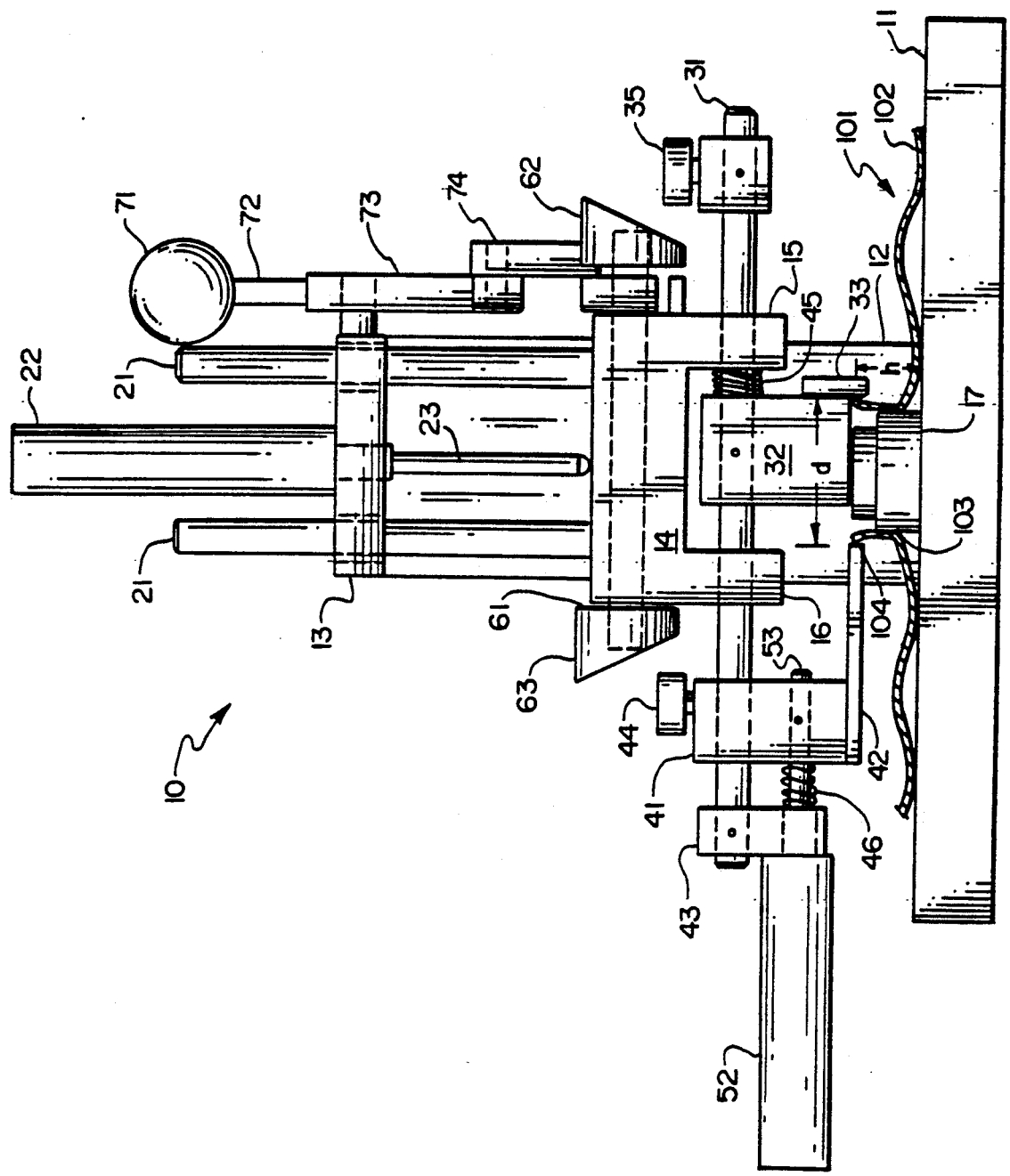
FIG. 5 is a front elevation view of the apparatus of the present invention with a heat exchanger plate mounted for collar measurement.
Figure 6:
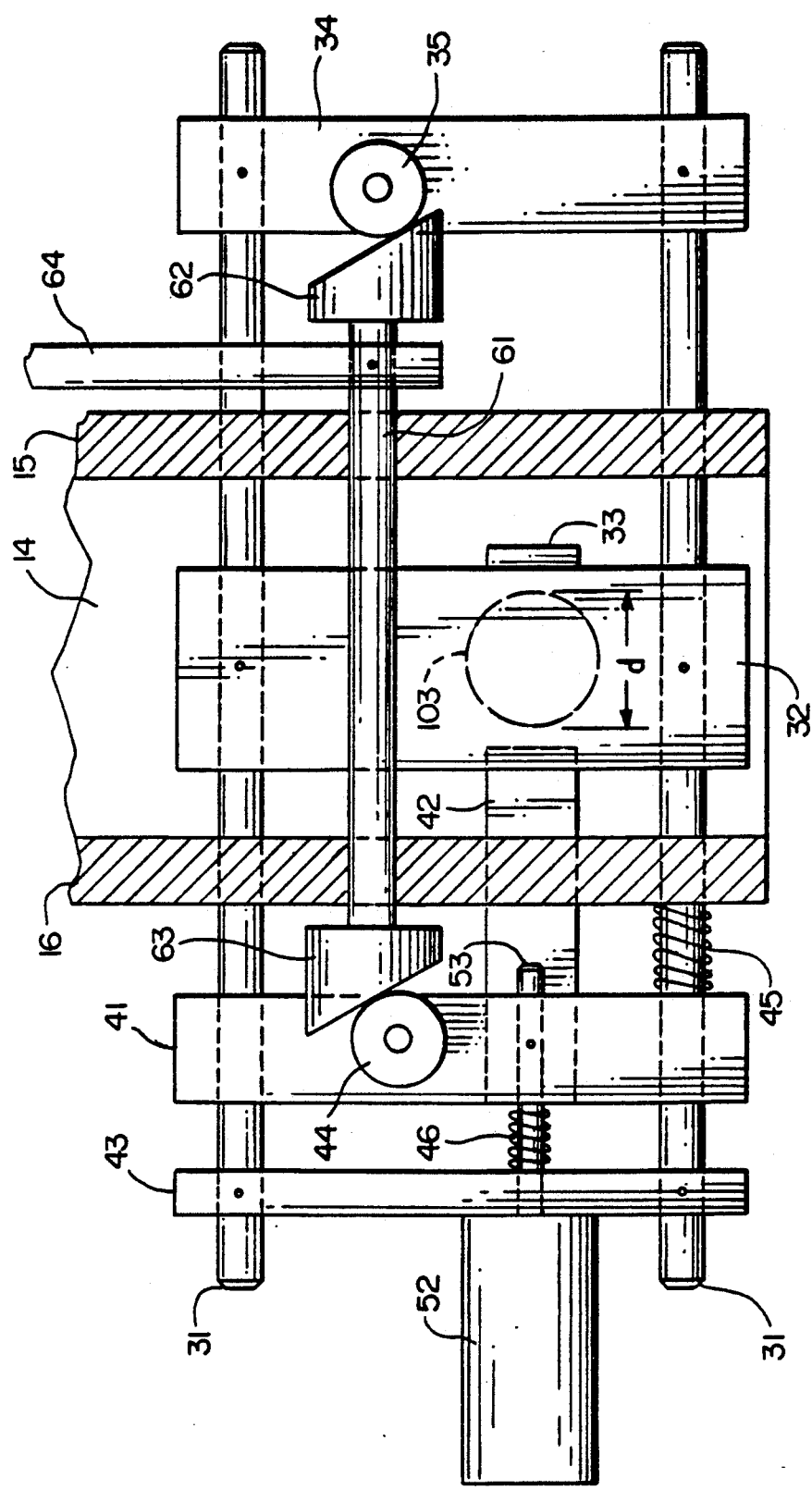
FIG. 6 is a top sectional view of a portion of the apparatus depicted in FIG. 3 taken through line V—V.

The operation of gauging apparatus is best understood in conjunction with reference to FIGS. 4, 5 and 6, FIG. 5 being a front elevation view of gauging apparatus lo with a plate fin 101 mounted for measurement of its fin collar 103 and FIG. 6 being a top sectional view of a portion taken through line VI—VI (FIG. 3), of gauging apparatus 10

Handle 71 has two positions: MEASURE and LOAD. By the operation of gravity, it is normally in the MEASURE position. As an operator moves handle 71 from the MEASURE position toward the LOAD position, cam link 64, through the interactions of lift lever 73 and lift link 74, first rotates cam shaft 61 to one of its limits of rotation As handle 71 is rotated further toward the LOAD position, carriage 14, together with all members mounted on it, is upwardly displaced, providing clearance under carriage 14 and the members mounted on it, particularly measuring block 32, for the placement of a plate fin such as plate fin 101 on base 11 for measurement. As an operator moves handle 71 from the LOAD to the MEASURE position carriage 14 is downwardly displaced until measuring block 32 contacts plate fin outer end 103. The displacement of vertical probe 23 while measuring block 32 is resting on outer end 104 produces an output from vertical indicator 22 that is translatable into a measure of height h of fin collar 103. Further movement of handle 71 toward the MEASURE position causes cam link 64 to rotate toward its other limit of rotation As handle 71 is moVed from the MEASURE to the LOAD position, cam link 64 rotates cam shaft 61 and therefore cams 62 and 63. Through the action of cam follower 35, the rotation of cam 62 causes roller block 34 to move away from carriage 14. Because roller block 34 and measuring block 32 are both fixed to shafts 31 and because measuring blade 33 is fixed to measuring block 32, the movement of roller block 34 under the urging of cam 63 results in the movement of measuring blade 33 away from mount pin 17 Through the action of cam follower 44, the rotation of cam 63 causes blade block 41 to move away from carriage 14. Because measuring blade 42 is fixed to blade block 41, the movement of blade block 41 under the urging of cam 64 results in the movement of measuring blade 42 away from mount pin 17 Because indicator block 43 is fixed to shafts 31 and blade block 41 is slideably fitted to shafts 31, the movements of roller block 34 and blade block 41 under the respective urgings of cams 62 and 63 result in a relative displacement of blade block 41 toward indicator block 43 and thus a displacement of horizontal probe 53 with respect to horizontal indicator 52 The movements of measuring blades 33 and 42 away from mount pin 17 as handle 71 is moved from its MEASURE to its LOAD position allow clearance for the positioning of a plate fin collar on mount pin 17 for measurement.

With a plate fin positioned in apparatus 10 for measurement, and as an operator moves handle 71 from the LOAD to the MEASURE position, carriage 14 is lowered under the urging of gravity as described above. Further movement of handle 71 toward the MEASURE position causes rotation of cam shaft 61 through the action of cam link 64 as described above but in the opposite direction. As cm 62 rotates, the urging of spring 45 causes roller block 34 to move toward carriage 14, resulting in the movement of shafts 31 and further resulting in the movement of measuring blade 33, through the movement of measuring block 32, toward mount pin 17 until measuring blade 33 contacts fin collar 103. At the same time, as cam 63 rotates, the urging of spring 46 causes blade block 41 to move toward carriage 14, resulting in the movement of measuring blade 42 toward mount pin 17 until measuring blade 42 contacts fin collar 103 With both measuring blades 33 and 42 in contact with fin collar 103 the position of horizontal probe 46 with respect to horizontal indicator 52 results in an output from the indicator that is translatable to a measure of diameter d of fin collar 103. The independent but concerted movements of measuring blades 33 and 42 in measuring the diameter of a fin collar are much like the movements a human operator would make in measuring the diameter with a hand held caliper or micrometer.

The above description is of a preferred embodiment of the present invention. One skilled in the art may appreciate that modifications could be made without departing from the essence of the invention. It is intended therefore that the scope of the present invention be limited only by the following claims.

What is claimed is:

1. An apparatus for measuring the height and diameter of a collar in a generally planar plate, said collar being a generally cylindrical extrusion extending perpendicularly from the surface of said plate and having an outer diameter and a collar outer end, comprising:
    a base having a mount pin to receive and position said plate for measurement of said collar when said plate is placed on said base with said collar extending upward;
    a support post fixed to said base;
    a hanger fixed to said support post;
    a vertical shaft slideably mounted in said hanger;
    a carriage having a first leg and a second leg and fixed to said vertical shaft so that said carriage can be displaced vertically with respect to said hanger and said base;
    a first indicator fixed to said hanger and having a vertical indicator probe contacting said carriage so that vertical displacement of said carriage with respect to said hanger results in a similar displacement of said vertical indicator probe;
    a horizontal shaft slideably mounted through said first and second legs of said carriage;
    a measuring block fixed to said horizontal shaft between said carriage first and second legs, said measuring block mounted so that a lower surface of said measuring block will contact said plate fin outer end when said carriage is displaced downward;
    a first measuring blade projecting downward from said measuring block on a side of said block proximate to said carriage first leg;
    a blade block slideably mounted on said horizontal shaft outside said carriage first leg;
    a roller mount fixed to said horizontal shaft outside said carriage first leg;
    a second indicator fixed to said horizontal shaft outside said carriage second leg by means of an indicator block and having a horizontal gauge probe contacting said blade block so that displacement of said blade block with respect to said indicator block results in a similar displacement of said horizontal indicator probe;
    a second measuring blade mounted on said blade block and extending toward said first measuring blade;
    a rotatable cam shaft having a first and a second rotation limit mounted horizontally in said carriage;
    a first cam fixed to said cam shaft outside said carriage first leg;
    a second cam fixed to said cam shaft outside said carriage second leg;
    a first cam follower mounted on said roller mount so as to engage said first cam and to urge said roller mount, said measuring block and said first measuring blade outwardly away from said blade block and said second measuring blade when said cam shaft is rotated from said first to said second rotation limit;
    a second cam follower mounted on said roller mount so as to engage said second cam and to urge said blade block and said second measuring blade away from said measuring block and said first measuring blade when said cam shaft is rotated from said first to said second rotation limit;
    a first means for urging said measuring block and said first measuring blade horizontally toward said blade block and said second measuring blade;
    a second means for urging said blade block and second measuring blade horizontally toward said measuring block and first measuring blade;
    a cam link attached to said cam shaft;
    a rotatable handle having a load position and a measure position;
    a handle shaft connecting said handle to a lift lever mounted on said hanger; and
    a lift link connecting said cam link to said lift lever so that
    as said handle is moved from said measure position toward said load position, said cam link first rotates said cam shaft from said first to said second rotation limit, causing said first and second measuring blades to be urged away from each other through the interrelated actions of said first and second cams and cam followers, said roller block, said measuring block and said blade block until said cam shaft reaches said second rotation limit, then, as said handle is moved further toward said load position, said carriage, together with all members of said apparatus mounted to said carriage, is upwardly displaced so as to allow placement of said plate on said base for measurement, and as said handle is moved from said load position to said measure position, said carriage, together with all members of said apparatus mounted to said carriage, is downwardly displaced until said measuring block contacts said collar outer end, producing an output from said vertical indicator that is translatable into a measure of the height of said outer end from said surface, then, as said handle is moved further toward said measure position, said cam link rotates said cam shaft from said second to said first rotation limit, causing said first and second measuring blades to be urged toward each other through the interrelated actions of said first and second urging means, said first and second cams and cam followers, said roller block, said measuring block and said blade block, until said first and second measuring blades contact opposite sides of said collar outer diameter, producing an output from said horizontal indicator that is translatable to a measure of said outer diameter of said collar.

2. The apparatus of claim 1 in which said first and second urging means are springs.

* * * * *